E. W. CLARK.
SEGMENT FOR MOTION PICTURE SHUTTERS.
APPLICATION FILED FEB. 23, 1915. RENEWED DEC. 1, 1916.
1,233,186. Patented July 10, 1917.
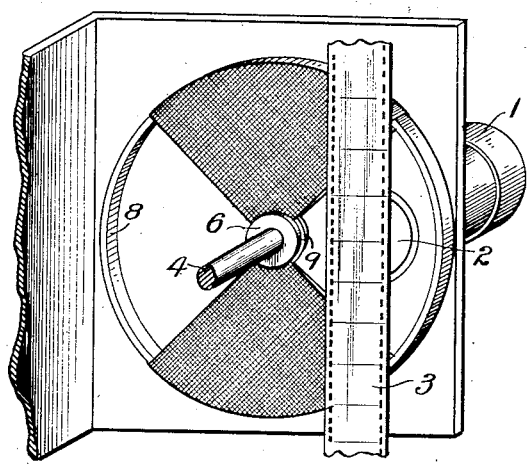
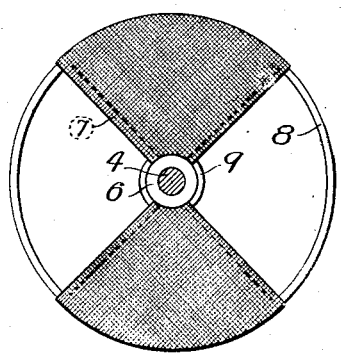 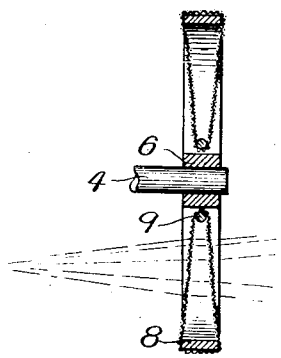 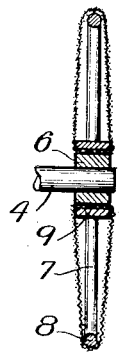
WITNESSES:
Lynn A. Robinson.
Retta J. Thomas
INVENTOR
Edwin W. Clark.
BY
Arthur C. Brown.
ATTORNEY

UNITED STATES PATENT OFFICE.

EDWIN W. CLARK, OF KANSAS CITY, MISSOURI, ASSIGNOR, BY DIRECT AND MESNE ASSIGNMENTS, TO PHOTO MOTION COMPANY, OF KANSAS CITY, MISSOURI, A CORPORATION OF MISSOURI.

SEGMENT FOR MOTION-PICTURE SHUTTERS.

1,233,186. Specification of Letters Patent. Patented July 10, 1917.

Application filed February 23, 1915, Serial No. 9,904. Renewed December 1, 1916. Serial No. 134,228.

*To all whom it may concern:*

Be it known that I, EDWIN W. CLARK, a citizen of the United States, residing at Kansas City, in the county of Jackson and State of Missouri, have invented certain new and useful Improvements in Segments for Motion-Picture Shutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a light obstructing segment for the shutter of a motion picture projector, and has for its principal object to provide means whereby the marked contrast between the illumination of a screen during the period of exposure of a film when the latter is stationary, and the total absence of illumination during the moving period may be reduced or eliminated, and thereby enhance the appearance of the projected picture and reduce the strain incident to viewing pictures projected by an apparatus utilizing a shutter having opaque sections.

It is a well known fact that in projecting pictures from a film onto a screen the film is moved intermittently so that the projection is made while the film is stationary, and that when the film is advanced an opaque portion of the shutter is interposed between the film and lens to completely block the picture during the moving period. This ordinary method, therefore, produces alternate periods of projection and blank so that the contrast is that between white and black on the screen. As the periods usually occur more rapidly than sixteen per second the shutter disturbance is hardly visible to the eye, but when the film is advanced at a slower speed the contrast is more noticeable and is always present.

In accomplishing the object of my invention I provide a light-obstructing segment of a shutter of mesh composition and of a plurality of plies, wherein the mesh of each ply is of such fineness that the strands are of greater thickness than the spaces therebetween and arrange the plies at opposite sides of the shutter at an angle to each other and at other than a right angle to the rays of light, in order that while light may be deflected by the strands of the first ply and diffused through the openings in the succeeding ply, the lines of a picture are prevented from reaching the screen without completely darkening the screen as the shutter segment passes across the projected rays.

In the drawings wherein my invention is illustrated in its preferred form,

Figure I is a perspective view of part of a projector equipped with a shutter containing my improvements.

Fig. II is an elevation of the shutter proper.

Fig. III is a cross section of the shutter particularly illustrating the arrangement of fabric in a two-ply shutter.

Fig. IV is a similar view of a reversed form of shutter segment.

Referring more in detail to the drawings: 1 designates the projector case, 2 the lens, 3 a film and 4 a shutter shaft, which parts are constructed and arranged in the ordinary manner so that the shutter shaft may be driven by the usual mechanism (not shown).

The shutter proper comprises a hub 6, which is fixed on the shaft 4 and has radial ribs 7 which carry a peripheral ring 8 to form a shutter frame.

Mounted on the rim 8 and attached to the hub 6 by a suitable clamp 9 are segments 10 of translucent mesh material, here shown to be, and preferably consisting of fabric such as silk or the like, wherein the threads are closely woven in order to form relatively small interstices.

In the preferred arrangement of the shutter the peripheral ring 8 and clamp 9 are of different width so that the plies of the shutter segment extend at an angle to each other from the clamp to the ring, so that rays of light striking strands in the first ply are deflected through the interstices of said ply and will impinge against the threads of the next ply in a line that will prevent their passing directly through the interstices of the succeeding ply and be thereby modified in intensity when deflected through the interstices of the latter ply.

While I have mentioned but a single segment, it is apparent that more may be used, as it is customary for shutters to comprise a plurality of segments in order to interrupt the projection a plurality of times during each revolution of the shutter.

In using a projector equipped with my improved shutter, the turning is arranged in the ordinary manner.

With a shutter of the construction herein described, when the shutter segment is interposed between the glower and the lens, the light is not entirely eliminated, as rays striking the first ply of the segment pass through the interstices and are deflected by the strands so that the rays are diffused between the plies; the light passing through the interstices being stopped or diffused by the strands in the succeding ply so that the rays are deflected and diffused before reaching the opposite side of the shutter and very materially softened without being entirely lost, thereby eliminating the marked contrast between the white and black periods of the ordinary projection.

While light may be diffused through the shutter, as described, the lines of the picture being projected, when diffused by the strands of the separate plies, are completely lost in the shutter so that no projection of the picture is made on the screen, so that the use of the shutter results in a partial projection of light with no projection of picture and thereby obviates a marked contrast between the periods of projection and blank without causing confusion by a partial projection of the picture during the stepping period of the film.

Having thus described my invention, what I claim as new therein and desire to secure by Letters-Patent, is:—

1. A shutter segment comprising a plurality of plies of foraminous material with the plies arranged at such angle to each other that light rays are diverted a plurality of times during their passage through the shutter segment.

2. A shutter segment comprising a plurality of plies of foraminous material with the plies arranged at an angle to each other and at other than a right angle to the rays of light, whereby light rays passing through the film during periods of movement also pass through the shutter segment and are diverted by the segment whereby diffused light but no picture reaches a screen.

3. The combination in a projector, of a shutter comprising a plurality of plies each arranged at other than a right angle to the other and to a direct path from the projector to a screen, whereby light rays are diverted through the shutter to throw a diffused light on a screen during periods of film movement.

In testimony whereof I affix my signature in presence of two witnesses.

EDWIN W. CLARK.

Witnesses:
 LYNN A. ROBINSON,
 LETA E. COATS.